United States Patent Office 3,039,277
Patented June 19, 1962

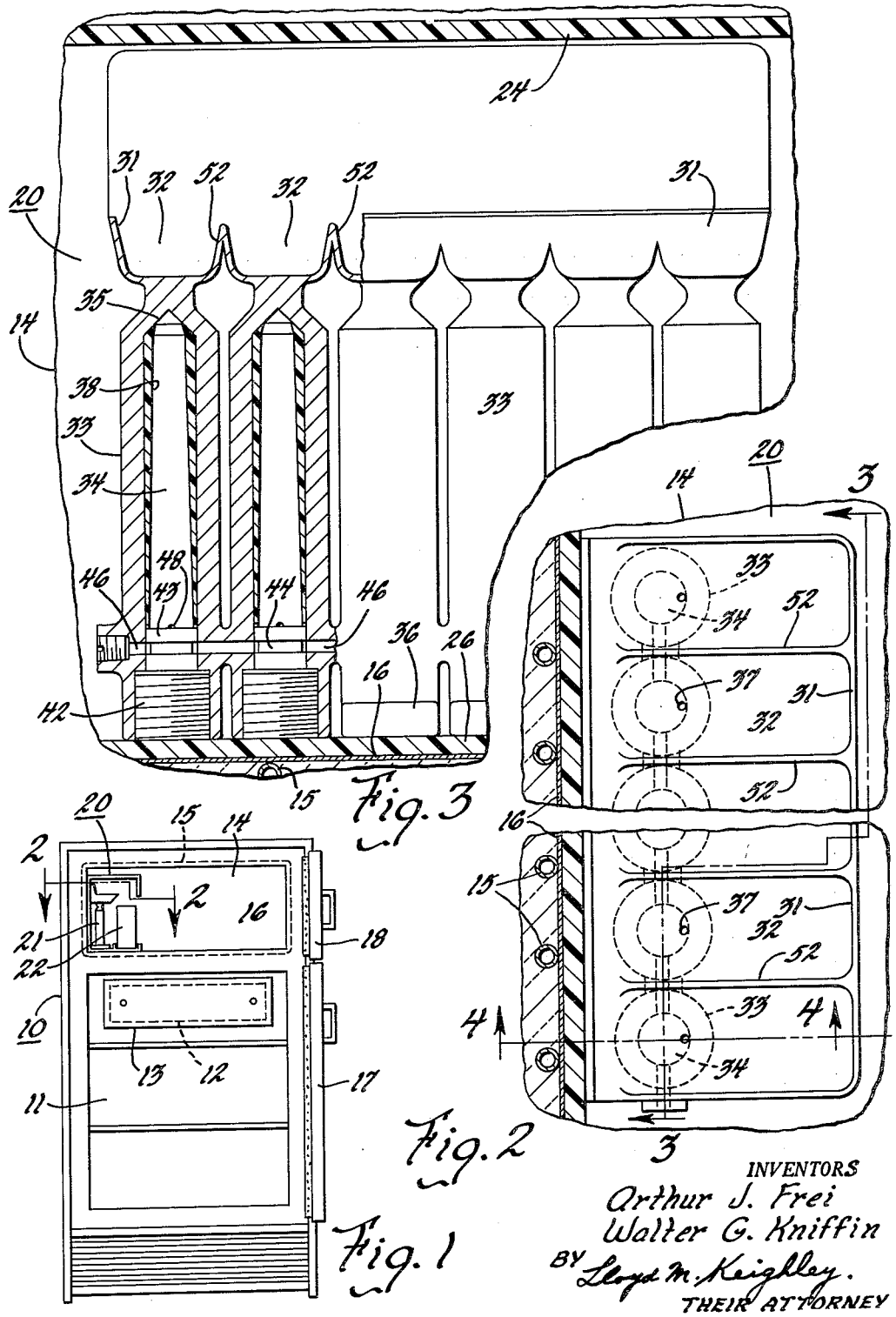

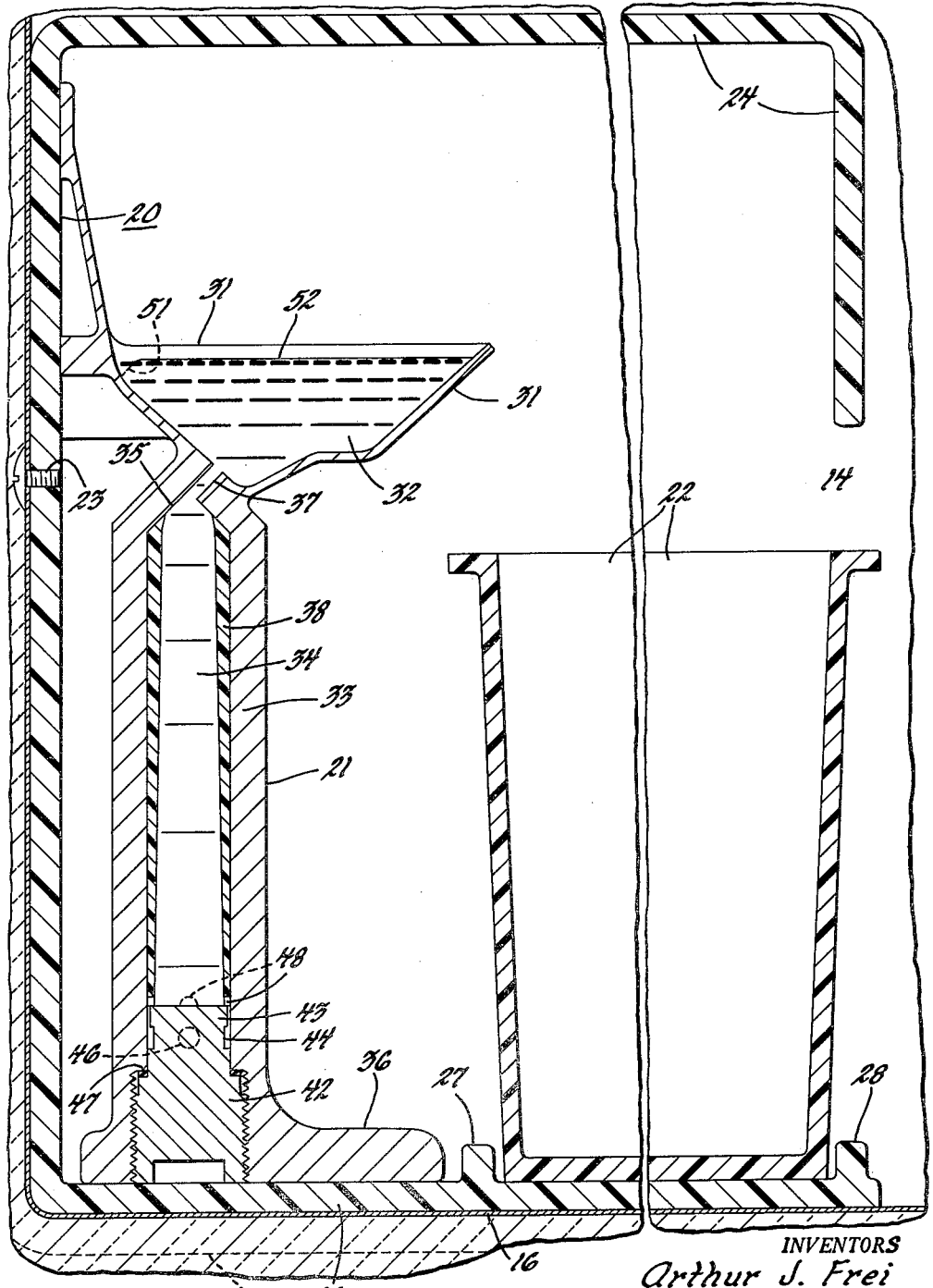

3,039,277
ICE BLOCK MAKER
Arthur J. Frei and Walter G. Kniffin, Dayton, Ohio, assignors to General Motors Corporation, Detroit, Mich., a corporation of Delaware
Filed Oct. 20, 1960, Ser. No. 63,850
7 Claims. (Cl. 62—71)

This invention relates to refrigeration and particularly to the making of ice blocks in a mold enclosed within a compartment of a refrigerator and the ejection of the blocks from the mold.

In the present invention we employ a principle of freezing water in a mold devoid of movable parts or walls and of ejecting ice blocks therefrom similar to the disclosure contained in the copending application of Arthur J. Frei, S.N. 741,256, filed June 11, 1958 entitled "Refrigeration" now Patent No. 2,971,346 dated February 14, 1961, assigned to the assignee of this application and the herein disclosed teaching constitutes an improvement over that application. The principle involved in said Frei application for effecting a differential freezing of two portions of a body of liquid in a mold is unique but is dependent upon the difference in volumetric capacity of liquid contained in the mold portions and a stem of ice that is gradually extruded through a restricted passage connecting chambers in the mold portions slowly moves an ice block outwardly of one of the chambers. It is desired to eliminate such dependency, to minimize the time required to move an ice block from a mold, once an ejection function is initiated, and to eject an ice block from the mold with such force or rapidity as to pop the block out of the mold and simultaneously fling same beyond walls thereof into an ice storage receptacle located in a freezing compartment of a refrigerator cabinet and associated with the mold therein.

An object of our invention is to provide an improved arrangement for differentially freezing water in two communicating chambers of a mold in a freezing device of an ice block maker whereby an ice block will be ejected from one of the chambers of the mold without heating same and while the mold is at a temperature below 32° F. solely in response to pressures developed in the mold.

Another object of our invention is to provide in an ice making apparatus or freezing device an arrangement whereby ice blocks frozen in a mold thereof are ejected therefrom with a popping action to eliminate the necessity of incorporating in a freezing device relative movable electrically driven elements or mechanically operated parts.

A further object of our invention is to removably locate a freezing device in a freezing or frozen food storage compartment of a refrigerator for making ice blocks in a mold of the device and automatically ejecting the blocks therefrom, which device is compact by virtue of being devoid of movable elements and therefor does not occupy too much of the valuable storage space in the compartment for movement of such elements.

A still further object of our invention is to provide a freezing device including a mold comprised of metal walls providing ice forming chambers therein communicating with each other by a restricted passage, one chamber of which mold has a nonmetallic lining insulating a portion of water therein from metal walls thereof, and when the mold is placed in a freezing compartment of a refrigerator for freezing water in the chambers, the lining causes an ice block to be popped out of one of the chambers and simultaneously flung beyond the walls of the mold.

A more specific object of our invention is to incorporate in an ice maker having a freezing device or mold comprised of relatively immovable walls forming an open top ice block cavity in one part of the mold and an associated communicating liquid chamber in another part of the mold both of which are adapted to contain a homogeneous body of liquid and wherein both parts of the mold are cooled below 32° F. at the same time, a novel means or method of retarding the freezing of a portion of liquid in the chamber to form a solid block of ice in the open top cavity prior to solidification of all of the liquid in the chamber whereby subsequent or final freezing of the retarded liquid portion causes expansion thereof in the chamber with a rapidity sufficient to impart a single sharp bump or sudden impact to the ice block which pops it out of the open top cavity and simultaneously flings the block away from and beyond walls of the mold.

Further objects and advantages of the present invention will be apparent from the following description, reference being had to the accompanying drawings wherein a preferred embodiment of the present invention is clearly shown.

In the drawings:

FIGURE 1 is a front view of a multiple compartmented household refrigerator cabinet with doors of compartments therein open showing an ice block making device of the present invention removably disposed in a freezing compartment of the cabinet;

FIGURE 2 is an enlarged fragmentary broken sectional view taken on the line 2—2 of FIGURE 1 showing the top of a mold of the ice block maker;

FIGURE 3 is an enlarged fragmentary view taken on the line 3—3 of FIGURE 2 showing portions of the mold in section and other portions thereof in elevation;

Figure 5:
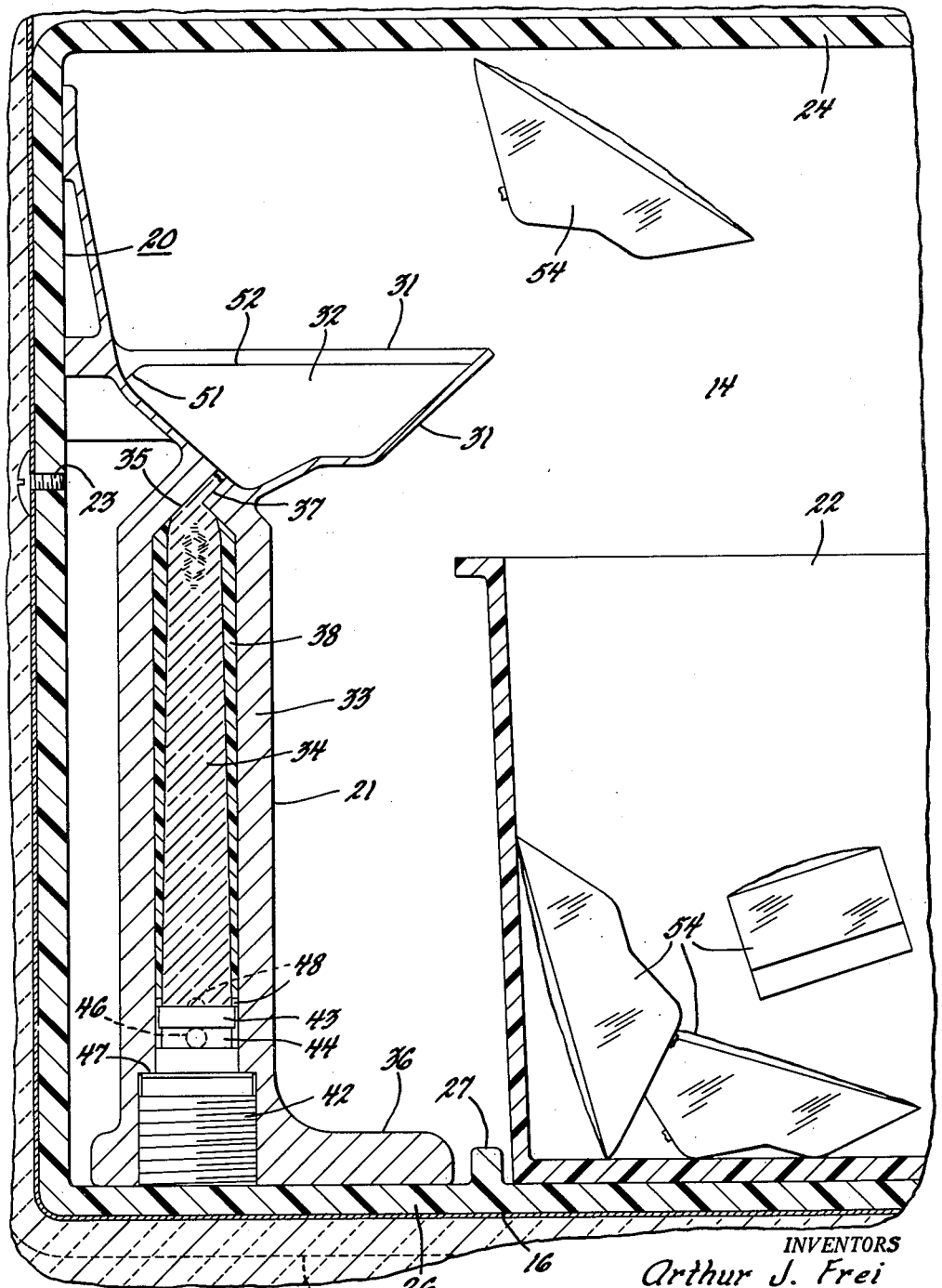

FIGURE 4 is an enlarged fragmentary broken sectional view taken on the line 4—4 of FIGURE 2 showing upper and lower chambers of the ice mold filled with water and connected by a restricted passage; and FIGURE 5 is a view similar to FIGURE 4 showing an expanded ice mass in a lower chamber of the mold and an ice block previously frozen in the upper communicating chamber popped out of the same and being flung beyond the mold walls.

Referring to the drawings for illustrating the present invention, we show in FIGURE 1 thereof a refrigerating apparatus including an insulated household refrigerator cabinet 10 of the multiple compartment type in which our ice block or ice making arrangement is incorporated. Cabinet 10 is provided with a lower unfrozen food storage compartment 11 which is cooled to a temperature of, for example 37° to 45° F. by a plate like sheet metal evaporator 12 of a refrigerating system associated with the cabinet which evaporator is located behind a protecting cover or baffle 13. Cabinet 10 is also provided with an upper frozen food storage compartment 14 which is cooled to a temperature well below 32° F. for the storage of frozen foods, for freezing foods and/or for freezing water in freezing devices removably disposed in compartment 14 into ice blocks or ice pieces for table use in chilling salads or the like and drinks in glasses. Compartment 14 is refrigerated to a below water freezing temperature say, for example, between 0° and 10° F. by an evaporator 15, of the refrigerating system associated with cabinet 10, which evaporator is in the form of a conduit coiled or wrapped around the outside of and secured in metal-to-metal contact to a metal can-like member 16 forming the liner of compartment 14 (see FIGURES 2 and 3). Doors 17 and 18 are hingedly mounted on cabinet 10 to provide individual closures for the compartments 11 and 14 respectively as is conventional in the art.

A substantially C-shaped nonmetallic preferably molded plastic member, generally indicated at 20, is supported upon the bottom wall of liner 16 within compartment 14, at one side thereof, and a freezing device or mold 21 together with a molded plastic ice block receiving and storage bucket or receptacle 22 are each removably placed on member 20 for association therewith and with one another to constitute elements of the ice block maker herein disclosed. Member 20 insulates the removable freezing device or mold 21 from the metal liner 16 and consequently holds the mold out of thermal conductive relationship with the refrigerant evaporator 15 whereby the entire mold is cooled only by the cold or chilled air in freezing compartment 14. The substantially C-shaped molded plastic member 20 may, if desired, be permanently mounted within compartment 14 and fixed or secured therein to liner 16 by screws or bolts 23 (see FIGURES 4 and 5). Member 20 includes a hood portion 24 which extends over the top of mold 21 and forms a deflector for ice blocks popped out of the mold and simultaneously flung beyond the walls thereof to direct the flinging blocks into storage receptacle 22 as will be hereinafter described. Member 20 also includes a lower foot portion 26 provided with parallelly extending raised ridges 27 and 28 (see FIGURE 4) which form pocket like divisions in the foot portion thereof and guide rails therealong for positioning and maintaining mold 21 and receptacle 22 in proper cooperative supported association with one another on the molded plastic member and for guiding the elements 21 and 22 therealong as they are placed or slid into compartment 14. The back wall of liner 16 of compartment 14 provides a stop for both the mold 21 and receptacle 22 to assure correct longitudinal alignment of these elements within the freezing compartment. It is proposed to supply two of the freezing devices or molds 21 with each refrigerator cabinet 10 so that one of them, after ice blocks have been ejected therefrom, may be removed from the freezing compartment 14 and placed in a kitchen sink or the like for thawing same while the other mold, after being filled with fresh water, is placed in the compartment for freezing and producing more ice blocks. In this manner a fairly good accumulation of ice blocks in receptacle 22 may be had if needed or desired. The freezing device or mold 21 is preferably in the form of a cast aluminum alloy structure comprised of a plurality of integral walls, immovable relative to one another, which provide chambers in different parts thereof and which walls provide a supporting base for the mold. For example, thin walls 31 at the upper part of mold 21 form a row of open top chambers or cavities 32 therein, relatively thicker walls 33 are bored out of the casting to form a row of liquid confining or captive chambers 34 therein each disposed below one of the open top chambers or cavities 32, which lower chambers 34 are preferably altho not necessarily cylindrical in horizontal cross sectional contour, and outwardly flared walls 36 providing the supporting base for the mold. A restrictor opening or restricted passage 37, of less magnitude than either of the chambers 32 and 34, connects these superimposed chambers to one another and establishes communication therebetween. The top of each bore or chamber 34 is formed by a beveled or inclined wall part 35 of mold 21 which tapers toward or merges into the wall of the smaller bore or restricted passage 37 and connects a chamber 34 with a chamber 32. We provide means for differentially freezing water or other liquid received in and common to the communicating chambers 32 and 34 and in accordance with our invention this means eliminates the necessity of one chamber of the mold being of a greater volumetric capacity than the chamber thereof with which it communicates. In other words, the open top chambers 32 and the captive chambers 34 may be of the same volume and yet our means for obtaining a differential freezing of water in these communicating chambers is effective for the purpose herein described. This means comprises a nonmetallic preferably mold plastic retarder member or insulator sleeve 38 lining each of the chambers 34 and insulating a portion of water received therein from metal walls thereof. It is to be noted that the walls of lining members or sleeves 38 are tapered throughout their length (see FIGURES 3, 4, and 5) and the thickened end wall portion thereof is located near the top of chambers 34 adjacent the bottom of the restrictors or restricted passages 37 in the inclined wall part 35 of the mold. The shape of lining members 38 of chambers 34 and the location of the thickened wall part of the members is important in the present improvement in that they effect a final freezing and expansion of a portion of the mass of water in chambers 34 closely adjacent the restricted passages 37 to provide a quick ejection or popping of ice blocks out of mold 21 as will be more fully described hereinafter. Sealing plugs 42 are threaded into the bottom end portion of each of the bores or chambers 34 to retain the nonmetallic lining members or sleeves 38 therein and to close the lower ends thereof. Plugs 42 are provided with a reduced part 43 beyond the threads thereon and inwardly of chambers 34 which part is undercut circularly as at 44 to register with water passages 46 provided in the mold 21. A gasket 47 (see FIGURES 4 and 5) is compressed between a plug 42 and a wall of the mold 21 to facilitate sealing of the lower end of chambers 34. A passage 46 extends intermediate each of the bores or chambers 34 and these passages serve to direct water during filling of the mold therewith into the plurality of chambers 34. Sleeve members 38 are cut away as at 48 and the clearance between the reduced diametered part 43 of plugs 42 and the side wall of a chamber 34 together with sleeve cut-outs 48 permit the flow of water from one chamber 34 to another thereof by way of passages 46 while filling the mold. As the open top cavities or chambers of mold 21 near filling with water, the water will flow from one chamber 32 to another through a niche 51 formed or provided in partitioning walls 52 between these chambers. When mold 21 is filled with water, at a kitchen sink, the level of water in the mold is below the top of bounding walls 31 and substantially even with the top of partition walls 52 so as to facilitate carrying of the filled mold from the sink and the placing thereof into the compartment 14. The thickened end of the retarding means, lining member or sleeve 38 being located at or just below the inclined wall part 35 of chambers 34 together with the lesser diametered restricted passage 37 provides or forms in each of the chambers a choke portion which has a function in this disclosure that should become apparent from the following description. The character of elements of the ice maker just described renders the same capable of installation in a freezing compartment of existing refrigerator cabinets so long as provision is made to insulate mold 21 out of thermal conductive relationship with the refrigerant evaporator employed to reduce the air within the freezing compartment to a temperature well below 32° F.

Assume that a housewife or other user of a refrigerator cabinet equipped with the presently disclosed ice maker or freezing device desires a ready supply of ice blocks in the removable storage bucket or receptacle 22 within the refrigerator. A mold 21 is held under a water faucet at the kitchen sink and the level of water in the mold is equalized throughout the same up to the top of partitions 52 by virtue of the water flowing from one chamber 34 to another through passages 46 and through the niches or equalizing valleys 51 in the partitions. Water filled mold 21 is now placed in freezing compartment 14 of refrigerator cabinet 10 and supported upon the C-shaped insulator member 20 therein intermediate the upright side wall thereof and guide rail 27 thereon. Thus, mold 21 contains two bodies of water in chambers 32 and 34 common to one another and communicating with each other by way of the restricted passages 37. Mold 21 is thusly insulated from or supported out of thermal conductive relationship with liner 16 and consequently evaporator 15 whereby both parts or portions of the mold, having chambers 32 and 34 therein, are simultaneously cooled solely by the low temperature of air within compartment 14 chilled by the refrigerant evaporator 15. The relatively poor heat conducting sleeves or members 38 lining chambers 34 insulate a portion of water contained in these chambers from metal walls of mold 21 and are therefore a retarding means in the present disclosure to insure differential freezing of water in the chambers 32 and 34 respectively of the mold regardless of a like or dissimilar volumetric water capacity of the chambers. The retarding means or insulator members or sleeves 38 cause freezing of water and expansion of the solidifying ice mass in captive chambers 34 subsequent to freezing water in the open top cavities or chambers 32 into solid ice blocks therein. In other words, during the simultaneous cooling of water in both parts or portions of mold 21 containing the chambers 32 and 34 respectively, solid ice blocks, indicated at 54 in FIGURE 5 of the drawings, are frozen in the open top chambers 32 prior to solidification of all of the mass of water in the lower captive or confining chambers 34 of the mold. The locating of the thicker end part of the tapered wall or lining member 38 adjacent restricted passages 37 and at the inclined walls 35 of mold 21 insures that water at this point or within this choke portion of chambers 34 will be the last to freeze or be completely solidified in the mold. It is to be understood that water about the reduced part 43 of plugs 42 and around the undercut part 44 thereof is frozen solid prior to the final freezing and expansion of water within the choke portion of chambers 34 to provide at this time a plurality of noncommunicating so-called ice operated motors in mold 21. Ice pieces are hard-frozen into the solid blocks 54 over and in the bores or restricted passages 37 and within the cavities 32 prior to solidification of all of the water in chambers 34. In other words, water in a passage 37 and in the lower part of a chamber 34 freezes and expands in a direction toward the upper thickened portion of a sleeve 38 within mold 21, and this choke portion of the mold together with the final expansion of water therein is utilized to produce a definite and advantageous result in that such pops an ice block out of the open top cavities or chambers 32 and simultaneously flings the block away from and beyond the walls of the mold. This last and relatively small substantially compressed portion of the water mass to ultimately freeze in an insulated and reduced diametered part of a chamber 34 at a predetermined low temperature of mold 21, below that at which the ice blocks 54 are frozen solid, expands with such rapidity and force as to burst or explode with a violence of sufficient strength to impart a sharp bump or sudden impart, through a passage 37, to the underside of an ice block 54 which instantaneously pops the block out of the open top cavity or chamber 32 and simultaneously flings it beyond walls of mold 21. A flinging ice block 54 strikes the deflector or hood portion 24 of C-shaped member 20, as shown in FIGURE 5 of the drawings, and is directed thereby into removable storage receptacle 22. In this manner a desirability, particularly in ice block makers of the character disclosed, is achieved in that we eliminate a delay or loss of time, once an ice block ejecting process or operation is initiated, between the loosening of ice blocks from walls of open top cavities or chambers 32 and complete ejection or popping of the block therefrom and simultaneous flinging of the blocks beyond walls of mold 21 into receptacle 22. This desirability is to be distinguished from slowly expanding a confining water mass outwardly of a mold chamber and from gradually extruding a stem or column of ice through a restricted passage from one chamber into another of an ice mold. After the finish of such an ice block freezing, ejecting or popping and flinging operation as is the result of our present disclosure, mold 21 is removed from compartment 14 of cabinet 10 and placed in a sink to thaw the frozen mass remaining in chambers 34 so as to condition the mold for a subsequent water fill and ice block freezing act within compartment 14. In the meantime the alternate or extra device or mold supplied with cabinet 10 may be filled with water and placed in compartment 14 and utilized to produce ice blocks therein.

While we have exemplified one form of providing a retarding means for causing a differential in the freezing of water in two communicating chambers of a mold and for causing a solid ice block to be popped out of an open top chamber and simultaneously flung beyond walls of the mold into an ice storage receptacle, it is to be understood that other retarding means, different from that herein illustrated, may be employed without departing from the spirit or concept of our invention. For example, it is within the realm of the present invention to form walls of an open top ice block forming cavity of a metal of high or good heat conductivity and to form the upper part of a water captive or confining chamber below the cavity of a metal of relatively low or poor heat conductivity or even of a nonmetallic material. It is also conceivable to utilize a small electric heater for warming that part of a chamber or a wall of a mold where solidification of the water in the chamber is desired to be delayed or retarded for the purpose herein set forth. Thus the means for retarding ultimate freezing of a portion of water in a chamber, as recited in the claims appended hereto, to finally expand that small substantially compressed portion of the water mass with such rapidity or explosive force as to apply a single sharp or sudden strong bump or impact, through a passage connecting two chambers of a mold to an ice block solidly frozen in an open top chamber, may be of several forms in so far as the scope of our invention is concerned.

Having described our improvement, it should be apparent that we have provided a new method of and device for making and harvesting ice blocks from a mold within a household refrigerator cabinet which functions irrespective of varied volumetric capacities between different chambers in the mold to obtain a differential freezing of water in the chambers. By insulating or retarding freezing of water in a confining chamber of a mold and attaining somewhat of a spot-like final point of freezing the water therein within a choke portion thereof adjacent a resistor passage we cause an explosive action at that point which is of a great force capable of popping ice blocks out of the mold and simultaneously flinging them beyond walls thereof. Thus, when the mold is observed by opening the freezing compartment door of the refrigerator cabinet the user thereof may detect whether or not ice blocks are readied for harvest from the storage receptacle in the compartment because the blocks will be located either in the mold or in the receptacle. The popping and flinging of the ice blocks occurs instantaneously and consequently the ice maker is infallible in operation because the user of the refrigerator is incapable of performing any act which might interfere with or delay ejection of ice blocks from the mold or freezing device. Our improved device is devoid of movable mold walls or other movable elements associated therewith and is therefor inexpensive to produce and capable of continued use over an extended period of time without repair or replacement thereof as compared to ice block making devices or apparatuses heretofore presented to the public.

While the embodiment of the present invention as herein disclosed, constitutes a preferred form, it is to be understood that other forms might be adopted.

What is claimed is as follows:

1. An ice maker comprising in combination, a compartment enclosing a mold, said mold including relatively immovable metal walls forming an open top chamber in one part thereof, a second chamber in another part thereof and a restricted passage providing communication between said chambers, said chambers being adapted to receive and retain water therein common thereto by way of said passage, means chilling air in said compartment whereby both parts of said mold enclosed therein are cooled at the same time by said chilled air to a temperature below 32° F., said second chamber having a nonmetallic member lining walls thereof in the vicinity of said restricted passage and insulating a portion of the water thereat from the metal of said mold for causing differential freezing of water in the chambers to form a solid block of ice in said open top chamber prior to complete solidification of the mass of water in the second chamber, said lining member limiting the last of the water mass in said second chamber to be solidified at a point therein closely adjacent said restricted passage, and the ultimate freezing of said insulated portion of the mass at said point expanding same with such rapidity as to impart through said passage a bumping force to said ice block which pops the block out of said open top chamber and simultaneously flings it beyond walls of said mold.

2. An ice maker comprising in combination, a compartment enclosing a mold, said mold including relatively immovable walls forming an open top chamber in one part thereof, a second chamber in another part thereof and a restricted passage providing communication between said chambers, said chambers being adapted to receive and retain water therein common thereto by way of said passage, an evaporator of a refrigerating system for chilling air in said compartment whereby both parts of said mold enclosed therein are cooled at the same time by said chilled air to a temperature below 32° F., said mold also having a retarding means associated with said second chamber thereof in the vicinity of said restricted passage for preventing solidification of that portion of the mass of water in the second chamber thereat until after water in said open top chamber has been frozen into a solid block of ice therein, and said chilled air ultimately freezing and expanding said portion of the water mass in said second chamber which acts through said passage upon said ice block to free the block from walls of said open top chamber.

3. The method of making an ice block in a compartment enclosing a mold comprised of walls immovable relative to one another providing an open top chamber, a second chamber and a restricted passage connecting the chambers and of ejecting the ice block from the mold which consists in filling the mold chambers and passage with a body of water common thereto, artificially chilling air in said compartment to cool both chambers and the passage of said mold enclosed within the compartment at the same time to a temperature below 32° F., retarding solidification of a portion of the mass of water in said second chamber in the vicinity of said restricted passage while cooling the mold for differentially freezing water in the chambers to form a solid block of ice in said open top chamber prior to solidifying all of the mass of water in said second chamber, and then freezing the retarded portion of the water mass in said second chamber to expand same with such violence as to impart a sudden impact through the restricted passage to said ice block for popping the block out of said open top chamber and for simultaneously flinging it beyond walls of said mold.

4. The method making an ice block in a compartment enclosing a mold comprised of integral metal walls immovable with respect to each other providing an open top chamber, another chamber and a restricted passage in said mold connecting the chambers and of ejecting the ice block from the mold which consists in: filling the mold chambers and passage with a body of water common thereto, artificially chilling air within said compartment for cooling both chambers and the passage of said mold at the same time therein to a temperature below 32° F., insulating a portion of the water in said another chamber from parts of the metal walls thereof in the vicinity of said restricted passage while cooling the mold for differentially freezing water in the chambers to form a solid block of ice in said open top chamber prior to solidifying all of the mass of water in said another chamber, utilizing the insulated portion of the water mass within said another chamber for limiting final freezing thereof closely adjacent said restricted passage, and finally freezing the insulated portion of the mass in said another chamber for causing expansion thereof with such intensity as to impart through said passage a bumping force to said ice block for popping the block out of said open top chamber and for simultaneously flinging it beyond walls of said mold.

5. An ice maker comprising in combination, a compartment enclosing a mold, said mold including metal walls forming an open top chamber in the upper part thereof, a second chamber in a lower part thereof below the open top chamber and a restricted passage providing communication between said chambers, said chambers being adapted to receive and retain water therein common thereto by way of said passage, means chilling air in said compartment whereby both parts of said mold enclosed therein are cooled at the same time by said chilled air to a temperature below 32° F., a nonmetallic sleeve lining walls of said second chamber, said sleeve having tapered walls with the thickened end thereof disposed adjacent said restricted passage to insulate a portion of the water in said second chamber from the metal of said mold, said sleeve causing differential freezing of water in the mold chambers to form a solid block of ice in said open top chamber prior to solidification of all of the mass of water in said second chamber, said nonmetallic sleeve localizing the last of the water mass in said second chamber to be solidified therein to a point near said restricted passage, and the ultimate freezing of the mass at said point expanding same with a violence which imparts a sudden impact through said passage to the underside of said ice block sufficient to pop the block out of the open top of the chamber in the upper part of said mold and to simultaneously fling it beyond the mold walls.

6. An ice maker comprising in combination, a compartment enclosing a mold, said mold including a plurality of relatively immovable walls forming an open top chamber in one part thereof, a second chamber in another part thereof, a restricted passage providing communication between said chambers and a choke portion in said second chamber adjacent said passage, said chambers being adapted to receive and retain water therein common thereto by way of said restricted passage, an evaporator of a refrigerating system for chilling air in said compartment whereby both of said parts of the mold enclosed therein are cooled at the same time by said chilled air to a temperature below 32° F., retarding means associated with said choke portion of said second chamber preventing solidification of a portion of the mass of water thereat until after water in said open top chamber has been frozen into a solid block of ice therein, and said chilled air ultimately freezing said retarded portion of the water mass in said choke portion of said second chamber and causing expansion thereof with a violence which imparts a single sudden impact through said restricted passage to said ice block sufficient to pop the block out of said open top chamber and to simultaneously fling it beyond walls of said mold.

7. In combination, a compartment enclosing a freezing device including a mold, said mold being comprised of walls immovable with respect to one another forming a first open top chamber in one portion thereof, a second chamber in another portion thereof and a restricted passage providing communication between said chambers, said second chamber having a choke part therein adjacent said restricted passage, said chambers being adapted to receive and retain water common thereto by way of said restricted passage therebetween, a refrigerating system associated with said compartment including a refrigerant evaporator for chilling air therein to a temperature below 32° F. and for simultaneously cooling said portions of said mold within the compartment, means for delaying freezing of that portion of the water in said choke part of said second chamber until after a solid block of ice has been frozen in said open top chamber, said means being effective independent of a volumetric difference in water contained in said chambers of the mold, and subsequent freezing of said delayed portion of water in said choke part of the mold expanding same with a rapidity which pops the ice block out of the open top of said first chamber and flings the block of ice beyond walls of said mold.

References Cited in the file of this patent

UNITED STATES PATENTS

| | | |
|---|---|---|
| 1,824,309 | Stover | Sept. 22, 1931 |
| 2,037,417 | Hull | Apr. 14, 1936 |
| 2,100,288 | Horlacher | Nov. 23, 1937 |
| 2,415,446 | Shoemaker | Feb. 11, 1947 |
| 2,770,102 | Roedter | Nov. 13, 1956 |
| 2,844,009 | Buchanan | July 22, 1958 |
| 2,971,346 | Frei | Feb. 14, 1961 |